US006982626B2

(12) United States Patent
Nedorezov

(10) Patent No.: US 6,982,626 B2
(45) Date of Patent: Jan. 3, 2006

(54) SYSTEM AND METHOD FOR ACTIVATION OF REMOTE FEATURES FROM AN AUTOMOTIVE VEHICLE

(75) Inventor: Felix Nedorezov, Rochester Hills, MI (US)

(73) Assignee: Ford Motor Company, Dearborn, MI (US)

( * ) Notice: Subject to any disclaimer, the term of this patent is extended or adjusted under 35 U.S.C. 154(b) by 183 days.

(21) Appl. No.: 10/604,623

(22) Filed: Aug. 5, 2003

(65) Prior Publication Data

US 2005/0030195 A1 Feb. 10, 2005

(51) Int. Cl.
*B60R 25/00* (2006.01)
*G05B 19/00* (2006.01)
*G06F 7/00* (2006.01)
*G08B 29/00* (2006.01)
*H04B 1/00* (2006.01)

(52) U.S. Cl. ........................ 340/5.71; 340/5.2; 340/5.5

(58) Field of Classification Search ............... 340/5.71, 340/5.2, 5.21, 5.23, 5.24, 5.5, 5.7, 5.72, 5.8
See application file for complete search history.

(56) References Cited

U.S. PATENT DOCUMENTS 5,252,960 A * 10/1993 Duhame .................... 340/5.64
5,379,453 A 1/1995 Tigwell ................... 455/151.2
5,619,190 A 4/1997 Duckworth et al. ... 340/825.22
5,654,686 A * 8/1997 Geschke et al. ....... 340/426.26
5,663,650 A * 9/1997 McMahon .................. 324/670
5,680,134 A 10/1997 Tsui ........................... 341/173
5,699,055 A 12/1997 Dykema et al. ....... 340/825.22
5,708,415 A 1/1998 Van Lente et al. .......... 340/525
5,722,058 A 2/1998 Umemoto et al. .......... 455/140
5,793,300 A 8/1998 Suman et al. ............ 340/825.2
5,798,688 A 8/1998 Schofield .................... 340/438
5,872,513 A 2/1999 Fitzgibbon et al. ......... 340/529
5,959,540 A 9/1999 Walter ................... 340/825.31
6,005,488 A 12/1999 Symanow et al. ..... 340/825.56
6,072,404 A 6/2000 Nolan et al. ........... 340/825.69
6,126,221 A 10/2000 Kern ......................... 296/37.7
6,127,922 A 10/2000 Roddy et al. ............... 340/426
6,131,019 A 10/2000 King ........................... 455/99
6,147,597 A 11/2000 Facory .................... 340/425.5
6,160,319 A 12/2000 Marougi et al. ........... 307/10.5
6,308,083 B2 10/2001 King .......................... 340/5.2
6,362,771 B1 3/2002 Schofield et al. ........... 341/176
6,377,173 B1 4/2002 Desai ......................... 340/539
6,392,534 B1 * 5/2002 Flick ..................... 340/426.17
6,443,580 B2 9/2002 Rommel ..................... 359/838
6,525,645 B2 * 2/2003 King et al. .................. 340/5.7
6,593,856 B1 * 7/2003 Madau .................. 340/825.69
6,606,492 B1 * 8/2003 Losey ........................ 455/411
6,661,350 B1 * 12/2003 Rohrberg et al. ...... 340/825.69
6,703,941 B1 * 3/2004 Blaker ................... 340/825.69

* cited by examiner

*Primary Examiner*—Brian Zimmerman
*Assistant Examiner*—Nam Nguyen
(74) *Attorney, Agent, or Firm*—Jennifer M. Stec; Artz & Artz

(57) ABSTRACT

A system (12) for activating a remotely controlled device (14) from an automotive vehicle (10) includes a key pad (24) that generates a first coded signal. A transmitter controller (20) is coupled to the key pad (24) and receives the first coded signal and generates a control signal in response to the first coded signal.

20 Claims, 2 Drawing Sheets

SYSTEM AND METHOD FOR ACTIVATION OF REMOTE FEATURES FROM AN AUTOMOTIVE VEHICLE

BACKGROUND OF INVENTION

The present invention relates generally to remote control devices, and more specifically to a system for remotely operating devices external to an automotive vehicle from the automotive vehicle.

Many vehicles include a remote control that is used to activate various types of devices such as garage door openers, home security systems, and exterior lighting. The transmitters for such devices may be incorporated directly into the vehicle such as in the vehicle visor. By depressing one or more of the buttons the system can be trained to operate external features such as a garage door. Typically, little security is associated with such features. That is, once access is gained to the vehicle the features may be operated with a touch of a button.

One drawback to such systems is that once an unauthorized person gains access to a key or to the vehicle the system may be operated. For example, if a vehicle with such a system is left in the driveway of a residence, access may be easily gained into the vehicle and the system activated to operate a garage door or the like to gain access to the residence.

One known system requires that a vehicle ignition be turned on with a vehicle key in order to activate the system. However, if an unauthorized person gains access to the vehicle with the vehicle key, the remotely operated devices such as a garage door may be operated.

It would therefore be desirable to provide a system that remotely operates various devices and includes security features to prevent unauthorized operation of the security devices.

SUMMARY OF INVENTION

The present invention provides improved security for operating a remote device.

In one aspect of the invention, a system for operating a remote device from an automotive vehicle comprises a key pad that generates a first coded signal and a transmitter controller coupled to the key pad receiving the first coded signal and generating a control signal in response to the first coded signal.

In a further aspect of the invention, a method of operating a remotely controlled device using a transmitter on an automotive vehicle comprises generating a first coded signal corresponding to a combination of buttons from a key pad coupled to the vehicle, determining a control signal corresponding to the first coded signal when the first coded signal is stored in the memory, and transmitting a control signal to the remotely controlled device corresponding to the first coded signal from a transmitter of the vehicle.

One advantage of the invention is an improved security in the operation of the remotely controlled devices is provided.

Other advantages and features of the present invention will become apparent when viewed in light of the detailed description of the preferred embodiment when taken in conjunction with the attached drawings and appended claims.

DETAILED DESCRIPTION

Figure 1:
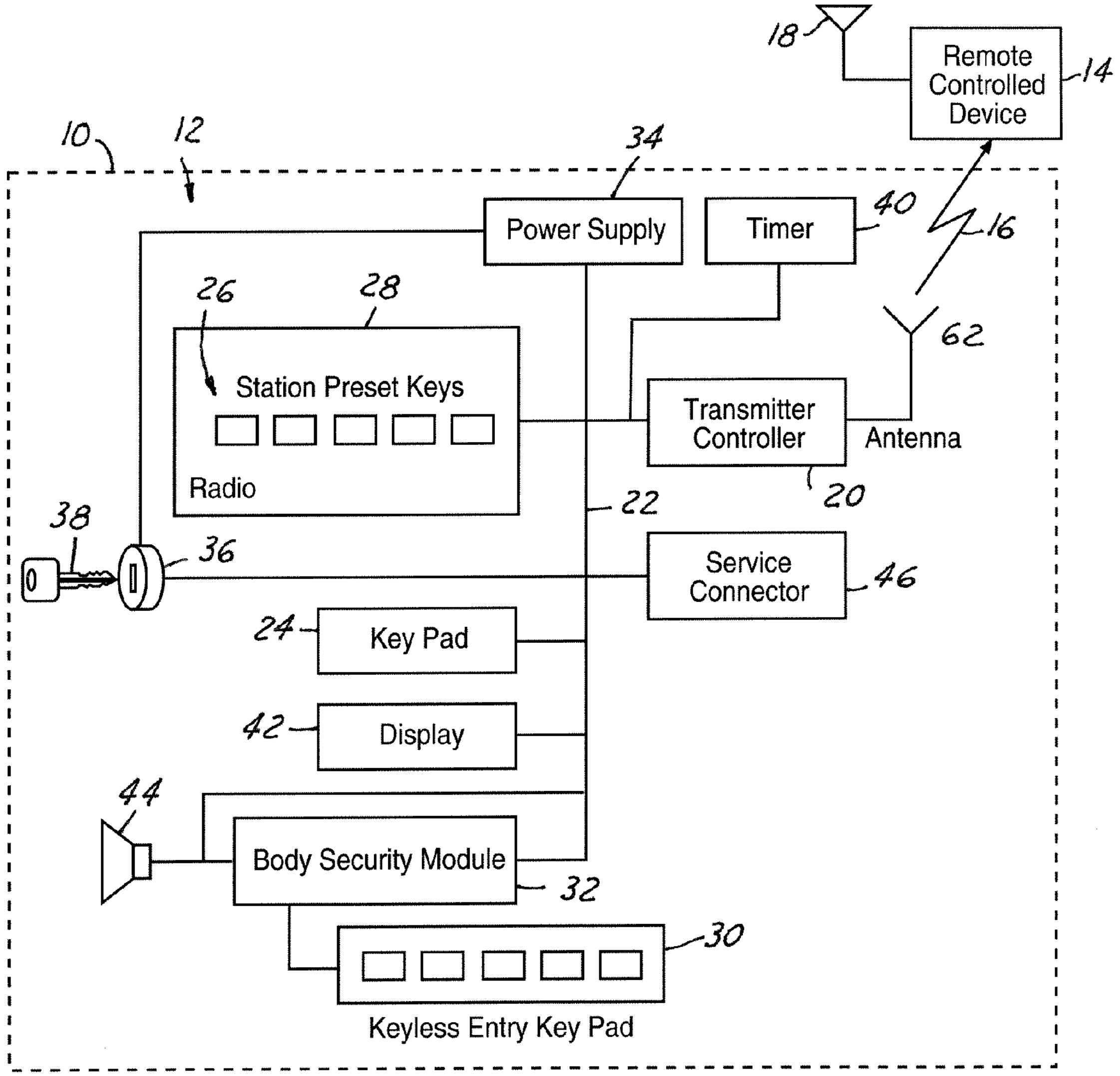
FIG. 1 is a block diagrammatic view of one embodiment of a system according to the present invention.

In the following figures the same reference numerals will be used to illustrate the same components.

The present invention is described with respect to an automotive vehicle that may include various types of automotive vehicles such as cars, trucks, planes, and boats.

Referring now to FIG. 1, an automotive vehicle 10 is illustrated having a system 12 for operating a remotely controlled device 14. Various types of remotely controlled devices may be activated by the system 12. That is, the remotely controlled device may be a garage door opener, gate, deadbolt, lighting, or other types of remotely controlled devices including another vehicle. The system 12 and the remotely controlled device 14 are wirelessly coupled together. The system 12 generates a control signal 16 that is used to operate the remotely controlled device 14. The control signal 16 is received through an antenna 18 that is coupled to the remotely controlled device 14. A remote transmitter for a device to be controlled such as a garage door opener remote may be used to train the system.

A transmitter controller 20 is used to generate the control signal 16. The transmitter controller 20 will be further described below in FIG. 2. The transmitter controller 20 may be a stand-alone device or incorporated into another transmitting device of the vehicle. For example, the radio transmitter may be used. In addition to the transmitter controller 20, the system 12 may include a portion of a vehicle bus 22. Vehicle bus 22 communicates various information between the devices on the vehicle bus.

Transmitter controller 20 is coupled to a key pad 24. Key pad 24 generates a first coded signal corresponding to a combination of button activations. Key pad 24 provides the transmitter controller 20 with the first coded signal and causes the transmitter controller to generate a control signal as will be described below. Key pad 24 is illustrated as a stand alone key pad coupled into the vehicle through vehicle bus 22. Key pad 24 may be dedicated to the operation of the remotely controlled devices. Alternatively, or in addition to the key pad 24, other devices incorporating already existing key pads may be used to generate the first coded signal. For example, a key pad 26 on a radio 28 that is coupled to the vehicle bus 22 may be used to generate the first coded signal. Another alternative location for a key pad is a keyless entry pad 30 that is coupled to a body security module 32. The keyless entry pad 30 is commonly used in Ford and Lincoln-Mercury vehicles. The keyless entry pad is typically located on the driver side door and used to provide a coded signal to the body security module 32 which in turn is used to operate the locks on the vehicle. The keyless entry pad 30 may also be used to generate the first coded signal to operate the remotely controlled device 14.

The automotive vehicle 10 may also include a power supply 34 coupled to the vehicle bus 22 that is used to supply power to the various devices. In addition, the automotive vehicle 10 may include an ignition lock 36 that has a key 38 associated therewith. The ignition lock 36 generates a lock status signal corresponding to the position of the key within the lock cylinder. The ignition lock 36 is used to initiate the starting of the vehicle and provide power to certain components. However, the present invention does not rely upon power from the ignition lock 36. As can be seen, the power supply 34 may be directly coupled to the vehicle bus for distribution to such devices as a key pad and transmitter controller 20. Thus, the operation of the remotely controlled device does not rely on the ignition to enable the system. The system is enabled by providing a proper combination of coded signals from the key pad.

A timer 40 may also be incorporated in the system. A timer 40 may be used to provide a significant delay between retries if an incorrect code is entered more than a predetermined number of times.

Various types of codes may be entered into the system. For example, certain codes may unlock the system whereas other codes may actuate the individual devices. Other codes may be used to initiate the programming of the system. A display 42 and an audible indicator 44 may provide respective visual and audible cues to the proper programming of the system. For example, display 42 may provide step-by-step instructions on an alpha-numeric display or through an instrument panel light. Audible indicator 44 may provide an audible cue as to the successful programming of the system. Both display 42 and audible indicator 44 may be coupled to the vehicle bus 22. In addition, a service connector 46 may be used to program the system. Service connector 46 may be used to reset the memory (shown in FIG. 2) of the controller 20. Also, service connector 46 may be used in combination with the ignition key 38 and ignition lock 36 to reset the transmitter controller 20. The service connector 46 is a connector that is used to couple to an external service tool (not shown) that is computer-based.

It should be noted that the key pad locations are provided as potential embodiments of the present invention. Any key pad within a vehicle may be used by the present invention. For example, if the HVAC module includes a key pad, such a module may be used to activate the present invention.

Figure 2:
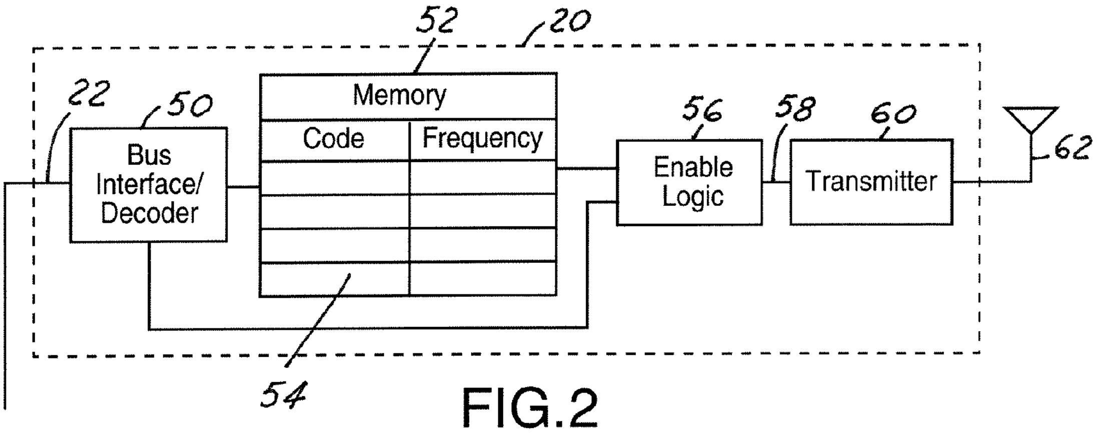
FIG. 2 is a block diagrammatic view of one embodiment of a transmitter controller according to the present invention.

Referring now to FIG. 2, transmitter controller 20 is illustrated in further detail. Transmitter controller 20 includes a bus interface that is used to receive information such as the coded signals from the bus 22. The bus interface may act as a decoder for receiving the information. Transmitter controller 20 may also include a memory 52 that is used to store the various codes and the associated frequency or code for enabling the remotely controlled device 14. Memory 52 may, for example, be non-volatile memory. As illustrated, memory 52 may include a table 54 having the various associations therein.

Enable logic 56 may also be included within the transmitter controller. Enable logic 56 compares the received codes with the codes in the memory 52 and provides a control signal output 58 corresponding to the proper frequency or code associated with the code provided to the system through the various key pads. The transmitter 60 which is coupled to an antenna 62 converts the control signal 58 into a wireless, preferably RF, signal for transmission to the remotely controlled device 14.

The bus interface 50 may also be used to trigger the clearing of the memory 52 or programming of the memory 52 when predetermined codes are entered into the system.

Figure 3:
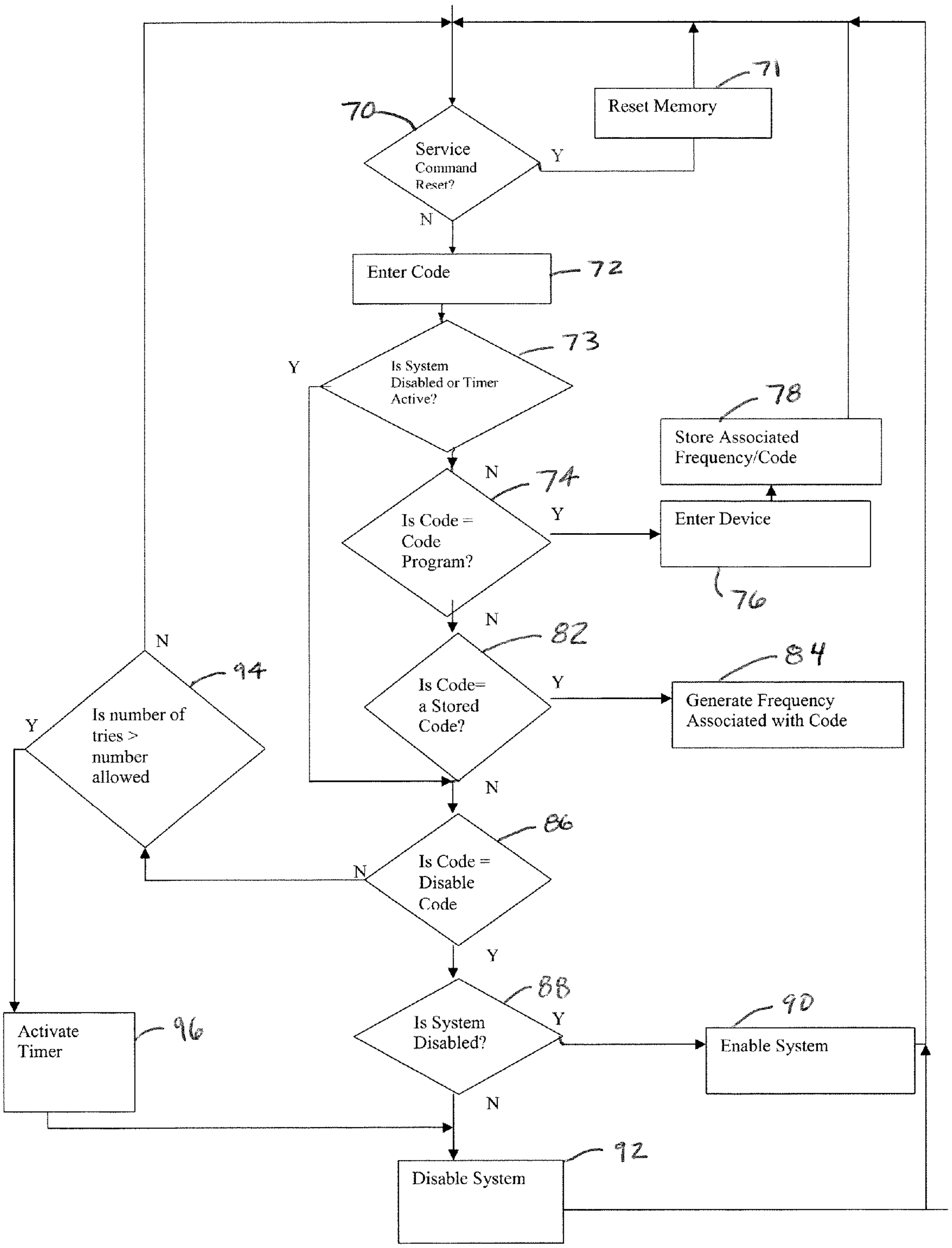
FIG. 3 is a flow chart illustrating the operation of one embodiment of the present invention.

Referring now to FIG. 3, one method for operating the system is illustrated. In step 70, whether or not a service command reset has been received is determined. If a service command reset has been received, the memory is reset in step 71. The system returns back to step 70.

If no service command has been received the system proceeds to step 72. In step 72 a code is entered from one of the key pads. The code is formed into an electrical pattern. The system proceeds through step 73 if the system is not disabled or a timer is not active. If the code corresponds to a program code in step 74, step 76 is executed in which a code associated with the device is programmed into the system or transmitter is "trained" by decoding signal from a transmitter that normally operates Remote Controlled Device (like garage opener remote). In step 78 a frequency or code associated with operating the device is also stored in the system. The data from steps 76 and 78 may be entered into the system in various ways including through the service connector 46 or through the key pads 28, 24, or 30, alone or in combination with the help of display 42, audible indicator 44, and the operation of the ignition lock 36 by key 38. The information is stored in the table within memory 52.

Referring back to step 74, if the code is not a programmed code, the memory 52 is checked to determine whether the code is a stored code. If the code is a stored code in step 82 the frequency or the other related identifying characteristic associated with the code is generated in step 84 and transmitted from the transmitter controller 20.

Referring back to step 82, if a code is not a stored code the code may be a disable code. If the code is a disable code in step 86, the system is checked to determine if the system is disabled in step 88. If the system is disabled and may not be activated unless another code or the disable code is activated in step 90. That is, the ability to generate a transmitter code may be disabled until the disable code or another code is entered into the system through a key pad. If the system is not disabled in step 88, the system is disabled in step 92.

Referring back to step 86, if the code is not a disable code then the system determines if the number of tries is greater than an amount allowed in step 94. If the number of tries is not greater than a number allowed in step 94, step 70 is executed. If the number of tries is greater than a number allowed, a timer is activated in step 96 and the system is disabled in step 92. A new number or code cannot be tried for a predetermined amount of time.

As described above, the present system does not rely upon the operation of the ignition lock or switch 36 in its operation. The system may be activated without a key and thus even if the key is obtained by an unauthorized user, the system will not operate the remotely controlled device unless a particular code is provided to the vehicle from the key pad. Further, wire tampering in order to enable the ignition lock will not enable the system unless the predefined code has been entered therein.

While particular embodiments of the invention have been shown and described, numerous variations and alternate embodiments will occur to those skilled in the art. Accordingly, it is intended that the invention be limited only in terms of the appended claims.

What is claimed is:

1. A system for operating a remote device from an automotive vehicle comprising:

a keypad generating a first coded signal;

a push button coupled to the security module;

a memory having a memory code; and a transmitter controller coupled to the memory and the push button, said transmitter controller disabling operation of the push button until the first coded signal matches the memory code, when the first coded signal matches the memory code enabling the push button, the transmitter controller generating a wireless control signal for operating the remote device in response to activating the push button.

2. A system as recited in claim 1 wherein the first coded signal corresponds to a combination of buttons.

3. A system as recited in claim 1 wherein the transmitter controller is coupled to the keypad though a multiplex bus.

4. A system as recited in claim 1 wherein memory stores a plurality of code signals associated with a plurality of control signals.

5. A system as recited in claim 1 wherein the memory comprises a non-volatile memory.

6. A system as recited in claim 1 further comprising a service connector for receiving a reset for clearing the memory.

7. A system as recited in claim 1 further comprising a second keypad for generating the first coded signal.

8. A system as recited in claim 1 wherein the keypad comprises a radio key pad.

9. A system as recited in claim 1 wherein the keypad comprises a stand-alone keypad.

10. A system as recited in claim 1 wherein the keypad comprises a keyless entry keypad.

11. A system as recited in claim 1 wherein the transmitter controller comprises a bus interface coupled to the memory, an enable logic comparing the first coded signal to codes stored in the memory.

12. A system as recited in claim 1 wherein the push button comprises a garage door opener.

13. A system for an automotive vehicle comprising:

a bus;

a keypad coupling a first coded signal and a disable code to the bus; and a transmitter controller coupled to the bus for receiving the disable code and first coded signal, said transmitter controller having an enabled state and a disabled state, said transmitter controller comprising a memory and enabling logic, said enabling logic changing the enabled state to a disabled state in response to the disable code and changing the disabled state to an enabled state in response to the disable code, said enabling logic determining a control signal corresponding to the first coded signal, said transmitter controller comprising a transmitter generating a wireless signal corresponding to said control signal when the transmitter controller is in the enabled state.

14. A system as recited in claim 13 further comprising a power source and an ignition lock having an ignition lock status, said first coded signal enabling the transmitter without regard to the ignition lock status.

15. A system as recited in claim 13 wherein the keypad comprises a radio key pad.

16. A system as recited in claim 13 wherein the keypad comprises a stand-alone keypad.

17. A system as recited in claim 13 wherein the keypad comprises a keyless entry keypad.

18. A method of operating a remotely controlled device using a transmitter of an automotive vehicle comprising:

generating a disable code corresponding to a combination of buttons from a keypad coupled to the vehicle;

changing a state of a transmitter controller from an enabled state to a disabled state or the disabled state to then enabled state in response to the disable code;

generating a first coded signal corresponding to a combination of buttons from a keypad coupled to the vehicle;

determining a control signal corresponding to the first coded signal when the first coded signal is stored in memory; and transmitting a wireless control signal corresponding to the first coded signal from a transmitter of the vehicle when the transmitter is in the enabled state.

19. A method as recited in claim 18 further comprising programming enabling the system by entering a program code;

entering a new code and corresponding frequency into the memory.

20. A method as recited in claim 18 further comprising resetting the memory through a service connector.

* * * * *

UNITED STATES PATENT AND TRADEMARK OFFICE

CERTIFICATE OF CORRECTION

PATENT NO. : 6,982,626 B2 
DATED : January 3, 2006
INVENTOR(S) : Felix Nedorezov It is certified that error appears in the above-identified patent and that said Letters Patent is hereby corrected as shown below:

Column 4,
Line 61, should read -- a push button coupled to a security module; --.

Column 5,
Line 7, should read -- transmitter controller is coupled to the keypad through a multiplex bus. --.

Column 6,
Line 22, “then” should read -- the --.
Line 33, should read -- programming the system by entering a program code; --.

Signed and Sealed this

Second Day of May, 2006

JON W. DUDAS
*Director of the United States Patent and Trademark Office*